United States Patent
Koga

(10) Patent No.: US 12,498,356 B2
(45) Date of Patent: Dec. 16, 2025

(54) MEMBER LINKING MECHANISM

(71) Applicant: SHIMADZU CORPORATION, Kyoto (JP)

(72) Inventor: Kiyonori Koga, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 328 days.

(21) Appl. No.: 18/202,164

(22) Filed: May 25, 2023

(65) Prior Publication Data

US 2023/0400437 A1 Dec. 14, 2023

(30) Foreign Application Priority Data

Jun. 14, 2022 (JP) .................................. 2022-095570

(51) Int. Cl.
*B01D 53/22* (2006.01)
*G01N 30/60* (2006.01)
*G01N 30/02* (2006.01)

(52) U.S. Cl.
CPC ... *G01N 30/6026* (2013.01); *G01N 2030/025* (2013.01)

(58) Field of Classification Search
CPC ..................... G01N 30/6026; G01N 2030/025
See application file for complete search history.

(56) References Cited

U.S. PATENT DOCUMENTS

| | | | |
|---|---|---|---|
| 3,735,640 A | 5/1973 | Chizhov et al. | |
| 2005/0011835 A1* | 1/2005 | Henderson | B01D 15/22 210/656 |
| 2005/0211617 A1* | 9/2005 | Held | G01N 30/6091 210/198.2 |
| 2009/0027835 A1* | 1/2009 | Hsu | H04M 1/0252 361/600 |
| 2009/0123097 A1* | 5/2009 | Barlerin | F16C 17/02 384/292 |
| 2018/0128786 A1 | 5/2018 | Takemoto et al. | |

(Continued)

FOREIGN PATENT DOCUMENTS

| CN | 2826428 Y | 10/2006 |
|---|---|---|
| WO | 2016/132439 A1 | 8/2016 |

OTHER PUBLICATIONS

Extended European Search Report dated Oct. 25, 2023, for corresponding application No. 23174079.6.

*Primary Examiner* — Anthony R Shumate
(74) *Attorney, Agent, or Firm* — Muir Patent Law, PLLC

(57) ABSTRACT

A member coupling mechanism includes a first member including a cylindrical member coupling portion including a stepped portion inclined along a circumferential direction from a tip end side of the member coupling portion toward a base end side thereof, a second member configured to be coupled to the member coupling portion, and a coupling member configured to be engaged with the stepped portion while holding an end portion of the second member on a first member side. The coupling member is provided with a rotatable cylindrical protrusion protruding toward an outer or inner peripheral surface of the member coupling portion to be engaged with the stepped portion. When the connecting member is rotated in the circumferential direction, the protrusion moves along the stepped portion while rotating to press the first and second members in an approaching direction to couple them.

7 Claims, 7 Drawing Sheets

(56) References Cited

U.S. PATENT DOCUMENTS

| | | | |
|---|---|---|---|
| 2019/0017975 A1* | 1/2019 | Komori | G01N 30/6026 |
| 2019/0040990 A1* | 2/2019 | Komori | F16L 37/142 |
| 2019/0186670 A1* | 6/2019 | Jencks | F16L 47/16 |
| 2020/0171513 A1* | 6/2020 | Nishimura | C23C 2/00344 |
| 2020/0206653 A1* | 7/2020 | Lundkvist | G01N 30/6026 |
| 2021/0190243 A1* | 6/2021 | Norman | G01N 30/6026 |

* cited by examiner

MEMBER LINKING MECHANISM

CROSS-REFERENCE TO RELATED APPLICATIONS

This application claims priority under 35 U.S.C. § 119 to Japanese Patent Application No. 2022-095570 filed on Jun. 14, 2022, the entire disclosure of which is incorporated herein by reference in its entirety.

BACKGROUND OF THE INVENTION

Field of the Invention

The present invention relates to a member coupling mechanism used for coupling two members in an airtight manner. Such a member coupling mechanism is used, for example, when a sealing cap is mounted on an opening of a sample vaporization unit of a gas chromatograph to seal the opening in a state in which an O-ring is sandwiched between the sealing cap and the opening.

Description of the Related Art

The following description sets forth the inventor's knowledge of related art and problems therein and should not be construed as an admission of knowledge in the prior art.

Generally, the gas chromatograph is provided with a sample vaporization unit for vaporizing the sample and feeding the vaporized sample into an analysis column. The sample vaporization unit is provided with a housing, and the housing has a space serving as a sample vaporization chamber therein. A sample inlet for injecting the sample into the sample vaporization chamber is provided at an upper portion of the housing. The lower portion of the sample vaporization chamber is connected to an analysis column to introduce a carrier gas from the upper portion of the sample vaporization chamber. The sample vaporization chamber is heated to a high temperature, and the liquid sample injected into the sample vaporization chamber is vaporized by the heat and fed to the analysis column by the carrier gas.

A cylindrical insert made of quartz-glass or the like is accommodated in the sample vaporization chamber in the housing. The sample injected through the sample inlet is vaporized inside the insert. Since the sample is vaporized inside the insert, the sample gas can be introduced into the analytical column without contacting the metallic inner wall of the sample vaporization chamber.

Since the insert comes into direct contact with the sample, the insert is a part that easily becomes dirty due to the adhesion of residues or the like after the sample vaporization. For this reason, the insert is detachably accommodated in the sample vaporization chamber so that the insert can be periodically replaced or cleaned. The upper surface of the housing is provided with an opening leading to the sample vaporization chamber, so that the insert can be inserted and removed through the opening. The opening of the housing is sealed by mounting a sealing cap.

A mechanism has been proposed to facilitate the attachment and detachment of a sealing cap to and from a housing (see Patent Document 1). The proposed mechanism uses a coupling member to secure a sealing cap to a housing in a pressed state. The coupling member is provided with a main body for holding a sealing cap and an elastic deformation portion coupled to the main body, and a protrusion for engaging a step provided on the outer surface of the housing is provided at a tip end of the elastic deformation portion.

The step provided on the outer surface of the housing has a slope, and the coupling member is rotated so that the protrusion slides along the step with the protrusion of the coupling member engaged with the step to elastically deform the elastic deformation portion and generate an elastic force on the elastic deformation portion. The sealing cap held by the main body of the coupling member is pressed against the housing by the elastic force of the elastic deformation portion. With this, an O-ring sandwiched between the insert and the sealing cap is pressed to secure the air-tightness of the housing.

PRIOR ART DOCUMENT

Patent Document

Patent Document 1: International Publication No. WO 2016/132439

Problems to be Solved by the Invention

The protrusion of the coupling member is formed by press-fitting a pin made of a resin, such as, e.g., PBI (polybenzimidazole), into a hole of the elastic deformation portion in view of the slidability and the like. However, when the pin is press-fitted into the hole of the elastic deformation portion, the pin deforms and locally generates a portion with low intensity, which may reduce the durability of the coupling member. Therefore, it is also conceivable that the material of the pin is made of stainless steel or the like. However, metallic material, such as, e.g., stainless steel, has such a problem that the sliding property of the protrusion reduces due to wear with an increase in the number of times of use of the coupling member, and the force required for rotating the coupling member increases.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

The present invention has been made in view of the above-described problems, and an object of the present invention is to achieve both durability and slidability of a protrusion provided to a coupling member.

Means for Solving the Problems

A member coupling mechanism according to the present invention, includes:
- a first member including a cylindrical member coupling portion having an opening at a tip end face thereof, the member coupling portion including a stepped portion inclined along a circumferential direction from a tip end side of the member coupling portion toward a base end side thereof;
- a second member configured to be coupled to the member coupling portion; and
- a coupling member configured to be engaged with the stepped portion of the member coupling portion while holding an end portion of the second member on a side of the first member,
- wherein the coupling member is provided with a rotatable cylindrical protrusion protruding toward an outer peripheral surface or an inner peripheral surface of the member coupling portion, the protrusion being configured to be engaged with the stepped portion of the member coupling portion, and wherein when the connecting member is rotated in a circumferential direction of the member coupling portion, the protrusion moves along the stepped portion while rotating to press the first member and the second member in an approaching direction to couple them.

Effects of the Invention

In the member coupling mechanism according to the present invention, the protrusion provided to the coupling member is rotatable, and the protrusion is configured to move along the stepped portion while rotating when the coupling member is rotated in the circumferential direction of the member coupling portion. Therefore, the friction between the protrusion and the stepped portion is reduced, which ensures the slidability between the protrusion and the stepped portion when the coupling member is rotated. Since the slidability between the protrusion and the stepped portion is secured by the rotation of the protrusion, it is not necessary to form the protrusion by press-fitting the pin made of resin, and the durability of the protrusion can also be secured.

BRIEF DESCRIPTION OF THE DRAWINGS

The preferred embodiments of the present invention are shown by way of example, and not limitation, in the accompanying figures.

DETAILED DESCRIPTION OF THE PREFERRED EMBODIMENTS

In the following paragraphs, some preferred embodiments of the present invention will be described by way of example and not limitation. It should be understood based on this disclosure that various other modifications can be made by those skilled in the art based on these illustrated embodiments.

One example of a sample vaporization unit in a gas chromatograph to which a member coupling mechanism according to the present invention is applied will be described with reference to the attached drawings.

Figure 1:
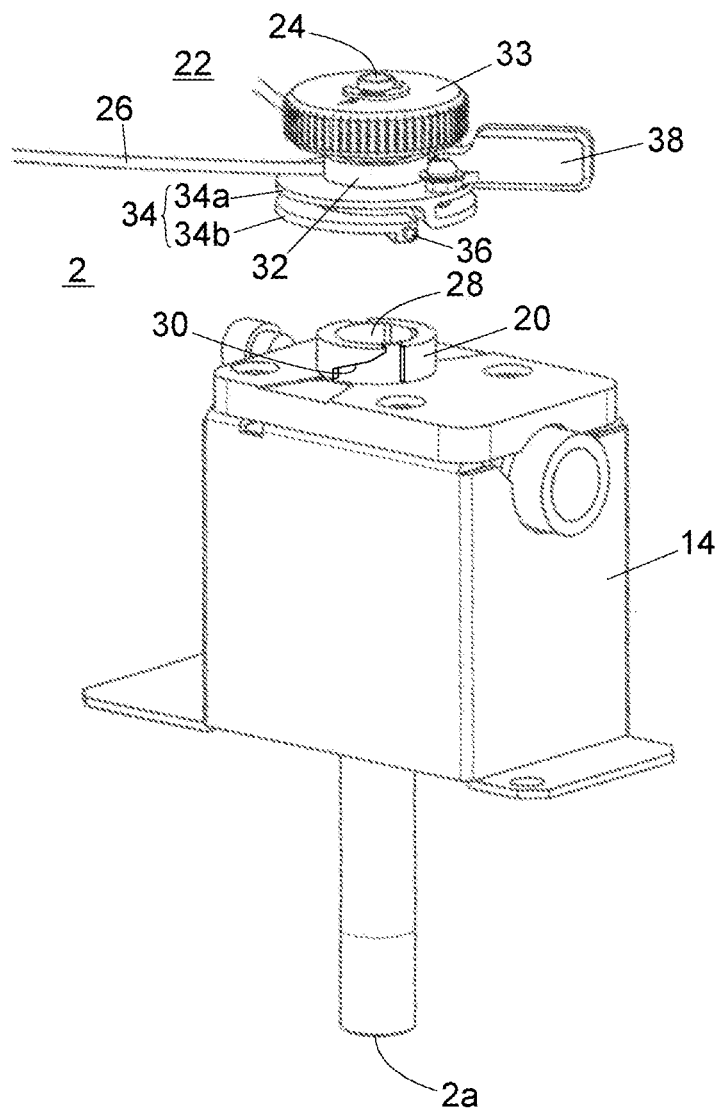
FIG. 1 is a perspective view showing a state before mounting a sealing cap according to one example of a sample vaporization unit to which a member coupling mechanism according to the present invention is applied.
Figure 2:
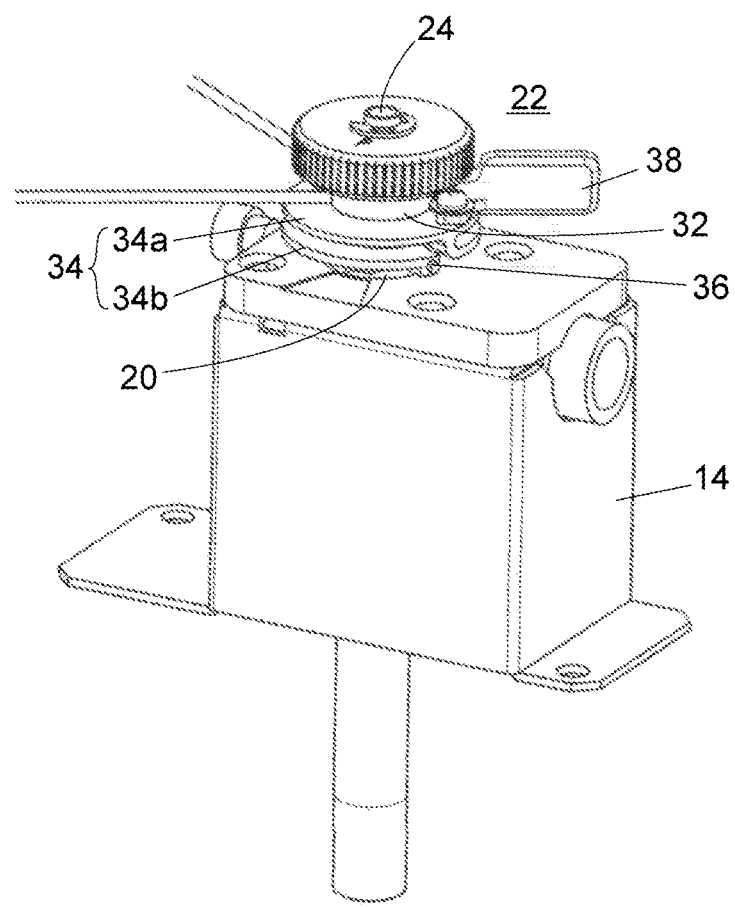
FIG. 2 is a perspective view showing a state after mounting a sealing cap according to the example.
Figure 3:
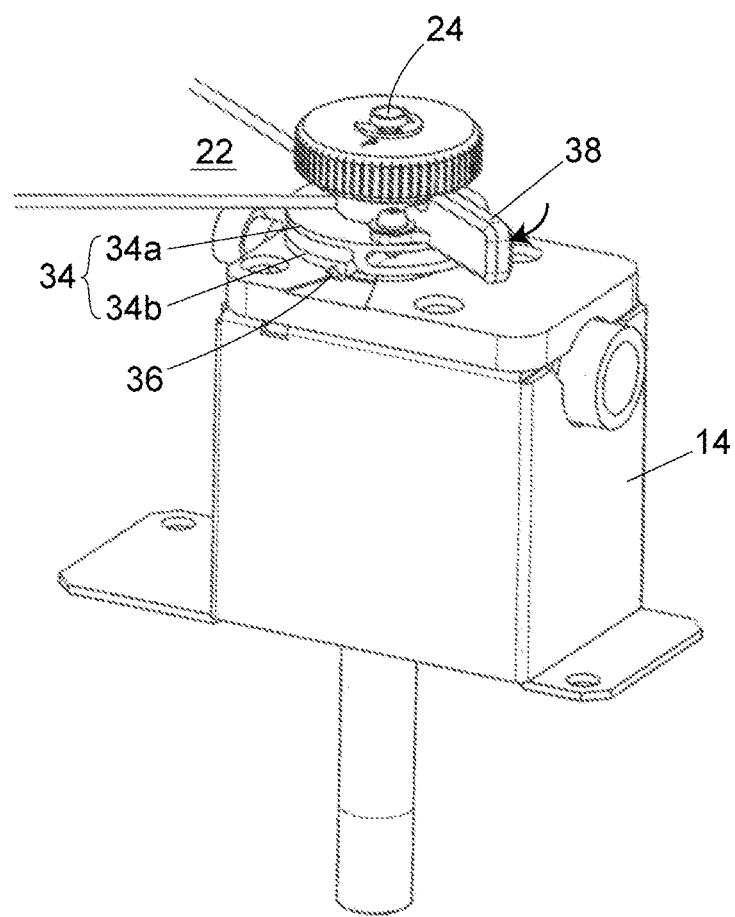
FIG. 3 is a perspective view showing a state after fixing a sealing cap according to the example.

As shown in FIG. 1 to FIG. 3, a housing 14 (first member) of a sample vaporization unit 2 has a prismatic shape in this example. Note that the shape of the housing 14 is not limited to a prismatic shape and may be a cylindrical shape or another shape.

The housing 14 is provided with a space 14a (see FIG. 4, hereinafter referred to as "internal space 14a") for accommodating an insert 16 therein. The internal space 14a is a cylindrical hole leading from the upper surface of the housing 14 to the lower bottom outlet 2a. The housing 14 is made of a metallic material having good thermal conductivity.

In the housing 14, a heater (not shown) is embedded to surround the internal space 14a. The insert 16 accommodated in the internal space 14a is heated by the heater. The insert 16 is a cylindrical member made of quartz-glass or the like.

The opening 28 of the housing 14 is sealed by the sealing cap 22 (second member). The sealing cap 22 is composed of a cylindrical sealing cap main body 32 and a disc-shape septum cover 33 attached to the top of the sealing cap main body 32. A needle insertion portion 24 is provided to the septum cover 33.

Figure 4A:
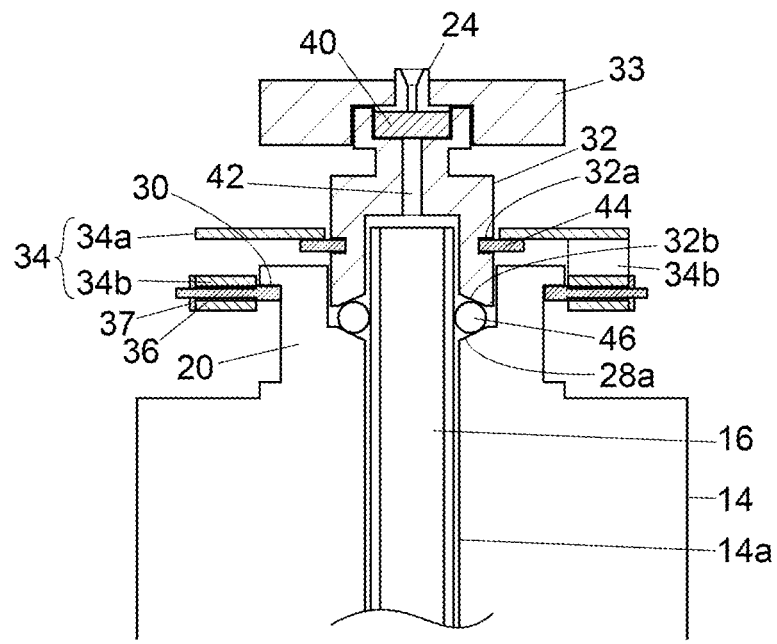
FIG. 4A is a cross-sectional view showing a state before tightening a sealing cap according to the example.

As shown in FIG. 4A, a septum 40 is arranged at the top of the sealing cap main body 32. A septum cover 33 is mounted on the top of the sealing cap main body 32 so that the needle insertion portion 24 is located above the septum 40.

The septum 40 is penetrable by a sample injecting needle inserted from the needle insertion portion 24 and closes the through-hole by the needle by its elasticity after the needle is pulled out. The septum 40 is made of an elastic material, such as, e.g., natural rubber and silicone rubber. The sample is discharged from the tip end of the needle penetrating the septum 40 to the side of the insert 16 via the through-hole 42 formed in the center of the sealing cap main body 32.

The edge of the opening 28 on the upper surface of the housing 14 projects upward in an annular shape to form a cap mounting portion 20 (member coupling portion). The sealing cap 22 is secured to the cap mounting portion 20 by the coupling member 34. A stepped portion 30 is provided at two symmetrical locations on the outer peripheral surface of the cap mounting portion 20. The stepped portion 30 is inclined along the circumferential direction of the cap mounting portion 20 from the tip end side to the base end side of the cap mounting portion 20. This stepped portion 30 has a side facing the base end side of the cap mounting portion 20.

When attaching the sealing cap 22 to the housing 14, the pin 36 of the coupling member 34 attached to the sealing cap 22 is engaged with the side of the stepped portion 30. When the coupling member 34 is rotated in a plane (rotational plane) perpendicular to the axial direction of the cap mounting portion 20, the pin 36 moves along the side of the stepped portion 30 and is displaced in the axial direction of the cap mounting portion 20.

Figure 5A:
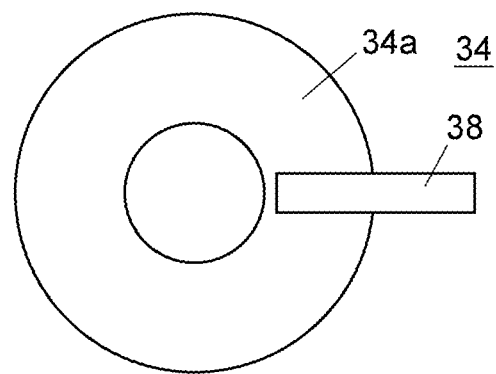
FIG. 5A is a plan view showing a coupling member of a member coupling mechanism according to the example.
Figure 5B:
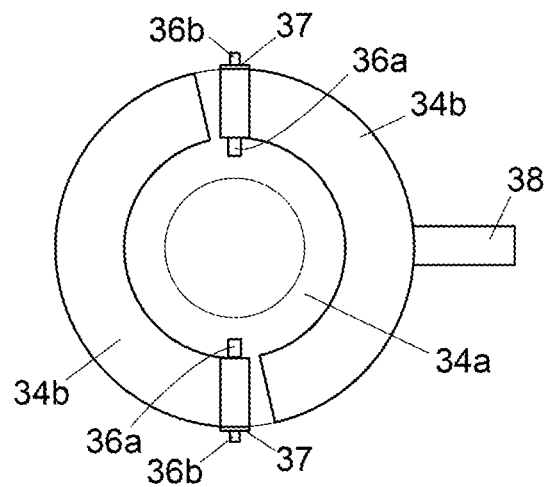
FIG. 5B is a bottom view of a coupling member according to the example.
Figure 5C:
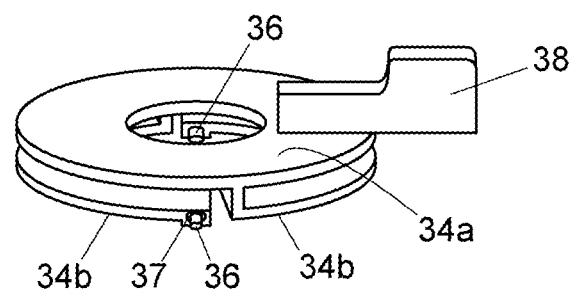
FIG. 5C is a perspective view of a coupling member according to the example.

As shown in FIG. 5A to FIG. 5C, the coupling member 34 is provided with a ring-shaped coupling member main body 34a with a central hole and two elastic deformation portions 34b on one side of the coupling member main body 34a. When the side of the coupling member 34 on which the elastic deformation portion 34b is not provided is defined as a front side, and the side of the coupling member 34 on which the elastic deformation portion 34b is provided is defined as a rear side, the coupling member 34 is attached to the housing 14 so that the rear side faces the side of the housing 14.

The elastic deformation portion 34b of the coupling member 34 is spaced apart from the coupling member main body 34a so as to be arcuate along the peripheral edge of the coupling member main body 34a. The base end of the elastic deformation portion 34b is integral with the coupling member main body 34a, but the tip end is free. That is, the elastic deformation portion 34b is a cantilever spring. The two elastic deformation portions 34b have the same shape. The coupling member main body 34a is provided with a lever 38 for holding and rotating the coupling member 34.

Figure 6:
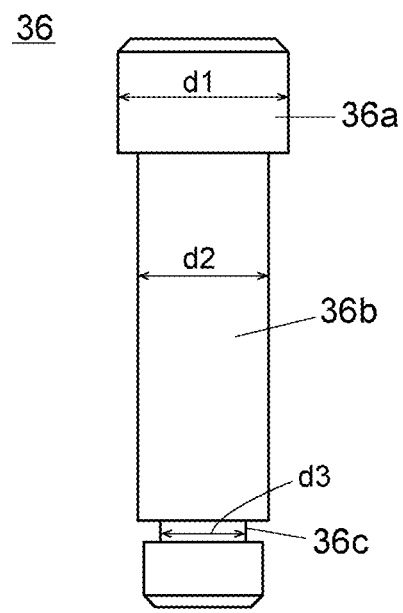
FIG. 6 is a view showing one example of a pin to be attached to a coupling member.

A pin 36 is rotatably attached to the tip end of each elastic deformation portion 34b. The pin 36 has a first cylindrical portion 36a and a second cylindrical portion 36b, as shown in FIG. 6. The first cylindrical portion 36a has an outer diameter d1 greater than the inner diameter of the hole formed at the tip end of the elastic deformation portion 34b. The second cylindrical portion 36b is connected to the first cylindrical portion 36a and has an outer diameter d2 smaller than the inner diameter of the hole formed at the tip end of the elastic deformation portion 34b. A groove 36c is provided at the end portion of the second cylindrical portion 36b opposite to the first cylindrical portion 36a. The pin 36 is fixed by a fastener 37 in a state of being fitted into the hole formed at the tip end of the elastic deformation portion 34b.

As shown in FIG. 5C, in the pin 36, the second cylindrical portion 36b is inserted into the hole of the elastic deformation portion 34b from the inner side to penetrate the elastic deformation portion 34b so that the first cylindrical portion 36a protrudes to the inner side of the elastic deformation portion 34b to form a protrusion. An end of the second cylindrical portion 36b opposite to the first cylindrical portion 36a protrudes outside the elastic deformation portion 34b to expose the groove 36c, and a fastener 37 is attached to the groove 36c, so that the pin 36 does not come off from the hole of the elastic deformation portion 34b. The first cylindrical portion 36a of the side pin 36 forms a protrusion that protrudes inward from the elastic deformation portion 34b.

The material of the pin 36 is not particularly limited, but a high-hardness metallic material, such as, e.g., stainless steel, can be used. When such a high-hardness metallic material is used, the pin 36 is prevented from being broken when a high load is applied to the pin 36, and the high durability of the coupling member 34 is obtained.

In a further preferred embodiment, at least the first cylindrical portion 36a of the pin 36 made of a high-hardness metallic material is subjected to a surface treatment, such as, e.g., a molybdenum disulfide coating, to reduce the frictional coefficient. This makes it possible to achieve both the durability of the coupling member 34 and the slidability of the pin 36 (protrusion).

Figure 7:
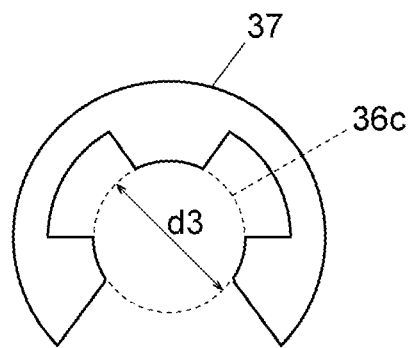
FIG. 7 is a view showing one example of a fastener for attaching a pin to a coupling member.

As the fastener 37, an E-ring as shown in FIG. 7 can be used.

In this example, the coupling member main body 34a and the elastic deformation portion 34b of the coupling member 34 are integrally formed by a production method, such as, e.g., a method of cutting from a metal block and an MIM (metal powder injection molding) method. Note that the coupling member main body 34a and the elastic deformation portion 34b may be formed as separate components and then connected to each other. In such a case, the materials of the coupling member main body 34a and the elastic deformation portion 34b need not be the same.

The coupling member main body 34a is movably engaged with the sealing cap main body 32 in the circumferential direction of the outer peripheral surface. That is, the coupling member main body 34a constitutes a second engaging portion that engages with the end portion of the sealing cap main body 32 that is a second member on the side of the housing 14.

Specifically, as shown in FIG. 4A, the outer peripheral surface of the sealing cap main body 32 is provided with a horizontal groove 32a which is an annular recess provided in the circumferential direction. A C-type retaining ring 44 is fitted in the horizontal groove 32a. The C-type retaining ring 44 is a C-shaped metallic member having a notch in a portion thereof. The C-type retaining ring 44 has an inner diameter of the same size as that of the outer diameter of the portion of the sealing cap main body 32 where the horizontal groove 32a is provided and an outer diameter larger than that of the outer diameter of the portion of the sealing cap main body 32 where the horizontal groove 32a is not provided.

The inner diameter of the central hole of the coupling member main body 34a of the coupling member 34 is larger than the outer diameter of the sealing cap main body 32 with no horizontal groove 32a and smaller than the outer diameter of the C-type retaining ring 44. The sealing cap main body 32 is fitted into the central hole of the coupling member main body 34a so that the C-type retaining ring 44 is located below the coupling member main body 34a.

Instead of the horizontal groove 32a and the C-type retaining ring 44 fitted in the groove 32a, a flange portion protruding from the outer peripheral surface in the circumferential direction of the sealing cap main body 32 may be integrally provided with the sealing cap main body 32.

Figure 8:
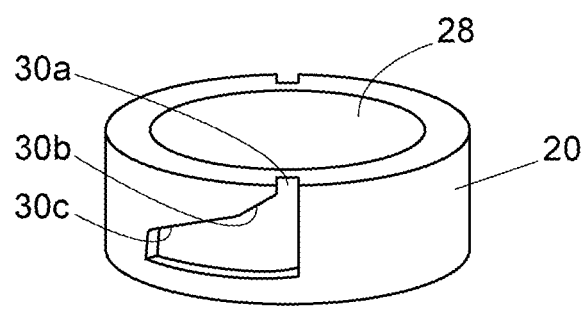
FIG. 8 is a perspective view of a cap mounting portion according to the example.

As shown in FIG. 8, the stepped portion 30 includes a fitting recess 30a for fitting the pin 36, the fitting recess 30a being provided on the upper end outer side of the cap mounting portion 20, and the continuous sides 30b and 30c facing the base end of the cap mounting portion 20. The sealing cap 22 is fixed to the cap mounting portion 20 as follows. That is, the sealing cap 22 is placed over the cap mounting portion 20 so that the pin 36 at the tip end of the elastic deformation portion 34b of the coupling member 34 fits in the recess 30a (the state shown in FIG. 2). Then, the coupling member 34 is rotated in one direction (clockwise direction in FIG. 3) so that the pin 36 moves along the sides 30b and 30c of the stepped portion 30 while rotating (the state of FIG. 3).

Since the pin 36 is rotatable, the frictional force between the pin 36 and the sides 30b and 30c of the stepped portion 30 is reduced, and therefore, good slidability of the pin 36 relative to the stepped portion 30 is obtained. In a case where the pin 36 is press-fitted into the hole of the elastic deformation portion 34b and is not rotatable, the pin 36 slides on the sides 30b and 30c of the stepped portion 30 as the coupling member 34 rotates, and the pin 36 wears and the slidability and durability deteriorate.

The sides 30b and 30c of the stepped portion 30 are inclined with respect to the rotational plane of the coupling member 34 such that the pin 36 fitted in the recess 30a is displaced toward the base end of the cap mounting portion 20 as it moves clockwise along the outer peripheral surface of the cap mounting portion 20. The inclination angles of the sides 30b and 30c are different, and the inclination angle of the side 30c is gentler than the inclination angle of the side 30b.

As shown in FIG. 4A, at the opening side of the internal space 14a of the housing 14, an O-ring 46 (elastic sealing member) for sealing the clearance between the outer peripheral surface of the insert 16 and the inner wall surface of the internal space 14a is arranged. The O-ring 46 is made of, for example, fluororubber. In the vicinity of the opening 28 of the inner sidewall of the housing 14, an annular base 28a inclined so that the inner diameter becomes smaller as it goes downward is provided, and the O-ring 46 is supported by the base 28a.

The sealing cap main body 32 has a recess for accommodating the upper end of the insert 16 on the lower surface thereof, and a lower end portion thereof is accommodated in the opening 28 so as to sandwich O-ring 46 with the base 28a. The annular lower end face of the sealing cap main body 32 is inclined such that the inner diameter increases toward the lower side, which is opposite to the base 28a.

Figure 4B:
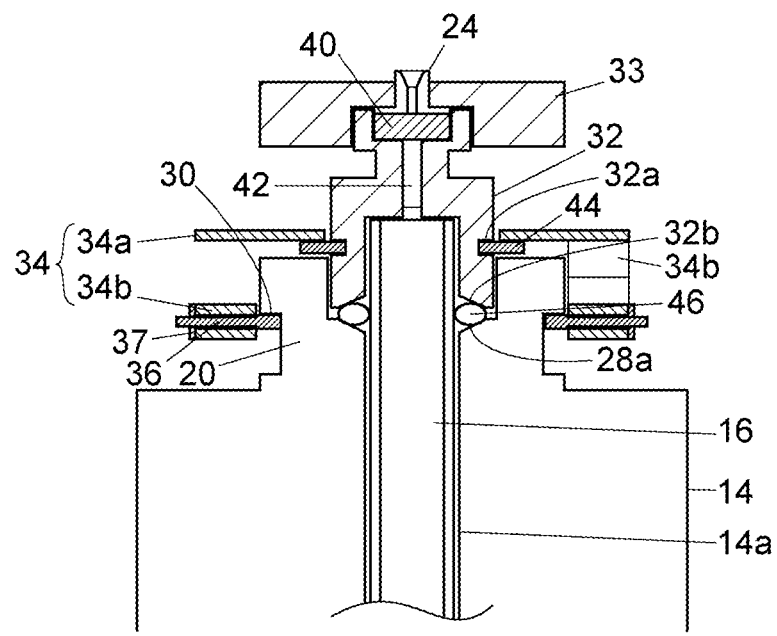
FIG. 4B is a cross-sectional view showing a state when a sealing cap is tightened according to the example.

When the sealing cap 22 is placed over the cap mounting portion 20 with the pin 36 of the coupling member 34 aligned with the recess 30a of the stepped portion 30, the lower end of the sealing cap main body 32 comes into contact with the O-ring 46. In this state, when the coupling member 34 is rotated so that the pin 36 moves along the side 30b and the side 30c of the stepped portion 30, as shown in FIG. 4B, the side pin 36 is displaced toward the base end side of the cap mounting portion 20, and the coupling member main body 34a presses the C-type retaining ring 44 downward.

As a result, the sealing cap main body 32 is pressed downward. The coupling member 34 presses the sealing cap main body 32 downward while rotating independently of the sealing cap main body 32 as the coupling member main body 34a engages with the C-type retaining ring 44. Therefore, only the coupling member 34 can be rotated without rotating the sealing cap 22.

The elastic deformation portion 34b of the coupling member 34 is elastically deformed to displace the position of the pin 36 in the axial direction of the cap mounting portion 20 relative to the coupling member main body 34a, and has a spring property that generates a restoring force corresponding to the displacement amount. When the coupling member 34 is rotated, and the pin 36 is moved to the end position of the side 30c of the stepped portion 30, the elastic force of the elastic deformation portion 34b presses the sealing cap main body 32 toward the opening 28. This deforms the O-ring 46 to such an extent that the ingress of gases into the gap between the inner wall of the internal space 14a and the outer peripheral surface of the insert 16 can be completely prevented.

The elastic deformation portion 34b of the coupling member 34 is designed to generate the elastic force required to deform the O-ring 46 by the required amount when the pin 36 reaches the end point position of the side 30c set as a position at a predetermined distance from the base end of the cap mounting portion 20.

The example described above is merely one example of an embodiment of the member coupling mechanism according to the present invention. Embodiments of the member coupling mechanism according to the present invention are s follows.

The member coupling mechanism according to one aspect of the present invention includes:
  a first member 14 including a cylindrical member coupling portion 20 having an opening 28 at a tip end face thereof, the member coupling portion 20 including a stepped portion 30 inclined along a circumferential direction from a tip end side of the member coupling portion 20 toward a base end side thereof;
  a second member 22 configured to be coupled to the member coupling portion 20; and
  a coupling member 34 configured to be engaged with the stepped portion 30 of the member coupling portion 20 while holding an end portion of the second member 22 on a side of the first member 14.

It may be configured such that the coupling member 34 is provided with a rotatable cylindrical protrusion 36a protruding toward an outer peripheral surface or an inner peripheral surface of the member coupling portion 20, the protrusion 36a being configured to be engaged with the stepped portion 30 of the member coupling portion 20. When the coupling member 34 is rotated in a circumferential direction of the member coupling portion 20, the protrusion 36a moves along the stepped portion 30 while rotating to press the first member 14 and the second member 22 in an approaching direction to couple them.

In the first aspect of the embodiment according to the present invention, it may be configured such that the protrusion 36a is a part of a pin 36 inserted into a hole formed in the coupling member 34.

In the first aspect of the present invention, it may be configured such that the pin 36 is made of stainless steel. This makes the protrusion more durable and improves the durability of the coupling member.

In the above-described case, it may be configured such that an outer peripheral surface of at least a part of the pin 36 forming the protrusion may be subjected to a surface treatment for reducing a frictional coefficient. This further improves the slidability of the protrusion.

Further, in the above-described first aspect of the present invention, it may be configured such that the pin 36 includes a first cylindrical portion 36a having an outer diameter larger than an inner diameter of the hole of the coupling member 34 and a second cylindrical portion 36b connected to the first cylindrical portion 36a, the second cylindrical portion 36b having an outer diameter smaller than the inner diameter of the hole of the coupling member 34. In such a case, the first cylindrical portion 36a is inserted into the hole of the coupling member 34 so that the first cylindrical portion 36a forms a protrusion.

In the above-described case, it may be configured such that the second cylindrical portion 36b of the pin 36 penetrates through the hole of the coupling member 34, and an end portion of the second cylindrical portion 36b opposite to the first cylindrical portion 36a protrudes from the hole, wherein a groove 36c is formed on an outer peripheral surface of the end portion protruding form the hole, and wherein a fastener 37 for preventing the second cylindrical portion 36b from coming off from the hole is attached to the pin 36 by being engaged with the groove 36c.

In a second aspect of the above-described embodiment, it may be configured such that the coupling member 34 includes
  a ring-shaped coupling member main body 34a surrounding an end portion of the second member 22 on a side of the first member 21, and
  an elastic deformation portion 34b having a base end and a tip end, the base end being connected to the coupling member main body 34a, the elastic deformation portion 34b extending parallel to the coupling member main body 34a along a circumferential direction of the coupling member main body 34a, the elastic deformation portion being provided on a side of the first member 14 than the coupling member main body 34a with a space from the coupling member main body 34a.

It may be configured such that the elastic deformation portion 34b is an arcuate cantilever spring that elastically deforms in a direction perpendicular to a rotational direction of the coupling member 34, and the protrusion 36a protrudes from a tip end of the elastic deformation portion 34b toward an outer peripheral surface of the member coupling portion 20.

DESCRIPTION OF SYMBOLS

2: Sample vaporization unit
2a: Sample vaporization unit outlet
14: Housing (first member)
14a: Internal space of a housing
16: Insert
20: Cap mounting portion (member coupling portion)
22: Sealing cap (second member)
24: Needle insertion portion
26: Carrier gas supplying piping
28: Opening
30: Stepped portion
30a: Recess
30c: Side of a stepped portion
32: Sealing cap main body
32a: Horizontal groove
33: Septum cover
34: Coupling member
34a: Coupling member main body
34b: Elastic deformation portion
36: Pin
36a: First cylindrical portion
36b: Second cylindrical portion
36c: Groove
37: Fastener
38: Lever (action portion)
40: Septum
42: Through-hole
44: C-type retaining ring
46: O-ring

The invention claimed is:

1. A member coupling mechanism comprising:
a first member including a cylindrical member coupling portion having an opening at a tip end face thereof, the cylindrical member coupling portion including a stepped portion inclined along a circumferential direction from a tip end side of the cylindrical member coupling portion toward a base end side thereof;
a second member configured to be coupled to the cylindrical member coupling portion; and
a coupling member configured to be engaged with the stepped portion of the cylindrical member coupling portion while holding an end portion of the second member on a side of the first member,
wherein the coupling member is provided with a cylindrical protrusion protruding toward an outer peripheral surface or an inner peripheral surface of the cylindrical member coupling portion, the cylindrical protrusion being configured to be engaged with the stepped portion of the cylindrical member coupling portion, the cylindrical protrusion having a central axis arranged in a protruding direction of the cylindrical protrusion and being rotatable on the central axis, and
wherein when the coupling member is rotated in a circumferential direction of the cylindrical member coupling portion, the cylindrical protrusion moves along the stepped portion while rotating on the central axis to press the first member and the second member in an approaching direction to couple them.

2. The member coupling mechanism as recited in claim 1, wherein the cylindrical protrusion is a part of a pin inserted into a hole formed in the coupling member.

3. The member coupling mechanism as recited in claim 2, wherein the pin is made of stainless steel.

4. The member coupling mechanism described in claim 3, wherein an outer peripheral surface of at least a part of the pin forming the cylindrical protrusion is subjected to a surface treatment for reducing a frictional coefficient.

5. The member coupling mechanism as recited in claim 2, wherein the pin includes a first cylindrical portion having an outer diameter larger than an inner diameter of the hole of the coupling member and a second cylindrical portion connected to the first cylindrical portion, the second cylindrical portion having an outer diameter smaller than the inner diameter of the hole of the coupling member, and
wherein the second cylindrical portion is inserted into the hole of the coupling member so that the first cylindrical portion forms the cylindrical protrusion.

6. The member coupling mechanism described in claim 5, wherein the second cylindrical portion of the pin penetrates through the hole of the coupling member, and an end portion of the second cylindrical portion opposite to the first cylindrical portion protrudes from the hole,
wherein a groove is formed on an outer peripheral surface of the end portion of the second cylindrical portion protruding from the hole, and
wherein a fastener for preventing the second cylindrical portion from coming off from the hole is attached to the pin by being engaged with the groove.

7. The member coupling mechanism as recited in claim 1, wherein the coupling member includes
a coupling member main body having a ring shape and surrounding an end portion of the second member on a side of the first member, the coupling member main body having a first surface facing the first member, and
an elastic deformation portion having a base end and a tip end, the base end being connected to the coupling member main body, the elastic deformation portion extending parallel to the coupling member main body along a circumferential direction of the coupling member main body, the elastic deformation portion being provided on a side of the first surface of the coupling member main body with the tip end spaced apart from the first surface of the coupling member main body,
wherein the elastic deformation portion is an arcuate cantilever spring that elastically deforms in a direction perpendicular to a rotational direction of the coupling member, and
wherein the cylindrical protrusion protrudes from the tip end of the elastic deformation portion toward the outer peripheral surface of the cylindrical member coupling portion.

* * * * *